UNITED STATES PATENT OFFICE.

JAKOB SCHMID, OF BASLE, SWITZERLAND, ASSIGNOR TO THE SOCIETY OF CHEMICAL INDUSTRY, OF SAME PLACE.

BETADELTA-AMIDONAPHTHOL.

SPECIFICATION forming part of Letters Patent No. 455,442, dated July 7, 1891.

Application filed January 22, 1889. Serial No. 297,197. (Specimens.)

*To all whom it may concern:*

Be it known that I, JAKOB SCHMID, a citizen of Switzerland, residing at Basle, Switzerland, have invented new and useful Improvements in the Manufacture of Betadelta-amidonaphthol Suitable for the Production of Coloring-Matters, of which the following is a specification.

This invention relates to the production of betadelta-amidonaphthol

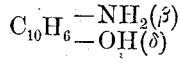

by melting the sodium salt of beta-naphthyl-amine-delta-monosulpho-acid

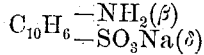

with caustic alkalies at from 260° to 300° centigrade.

I proceed, for instance, as follows: I add gradually one kilogram of well-dried sodium salt of beta-naphthylamine-delta-monosulpho-acid to a mixture of two kilograms of caustic soda and two kilograms of water, being heated to 260° centigrade, and cause the whole to melt during two to three hours at from 260° to 300°. The melt is then pulverized and dissolved in seven kilograms of water. The strongly-alkaline solution is partly neutralized by the addition of muriatic acid and the impurities are filtered off. The filtered liquid contains the new amidonaphthol in the form of its sodium salt. I then add muriatic acid until a neutral reaction is effected. The new amidonaphthol mixed with beta-naphthylamine-monosulpho-acid having remained unaltered is precipitated. I filter and extract the amidonaphthol from the residue by treating it with dilute muriatic acid. When soda is added to the muriatic solution, the new amidonaphthol is separated in the form of a grayish-white mass.

Betadelta-amidonaphthol is soluble in water rather difficultly, in hot benzine somewhat easier, in ether and in alcohol, in dilute caustic alkalies, and in acids easily. Betadelta-amidonaphthol crystallizes from alcohol in small white needles. It melts at 200° centigrade with decomposition.

I use the betadelta-amidonaphthol for the production of coloring-matters.

The betadelta-amidonaphthol is distinguished from Liebermann's ortho-amidonaphthol and para-amidonaphthol by a series of reactions, of which the following may be mentioned as characteristic, viz: Betadelta-amidonaphthol combines (*a*) with diazo combinations into azo colors, (*b*) with nitroso derivatives into phenazin colors, (*c*) with nitrous acid into nitroso compounds. Liebermann's amidonaphthols do not show these reactions. When shaking the ammoniacal solution of betadelta-amidonaphthol, the air has no influence. The betadelta-amidonaphthol when oxidizing does not produce either dinaphthol, beta-dequinone, nor alpha-naphthol-quinone—reactions which are of the characteristic of Liebermann's ortho and para amidonaphthol.

What I claim as new and original, and desire to secure by Letters Patent, is—

The new product betadelta-amidonaphthol

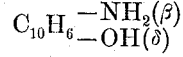

derived from the sodium salt of beta-naphthylamine-delta-monosulpho-acid,

melting at about 200° centigrade, crystallizing from alcohol in small white needles, scarcely soluble in water, more so in benzine, easily soluble in ether and alcohol.

In testimony whereof I have hereunto set my hand in the presence of two subscribing witnesses.

JAKOB SCHMID.

Witnesses:
GEORGE GIFFORD,
CHS. A. RICHTER.